United States Patent Office 3,071,389
Patented Jan. 1, 1963

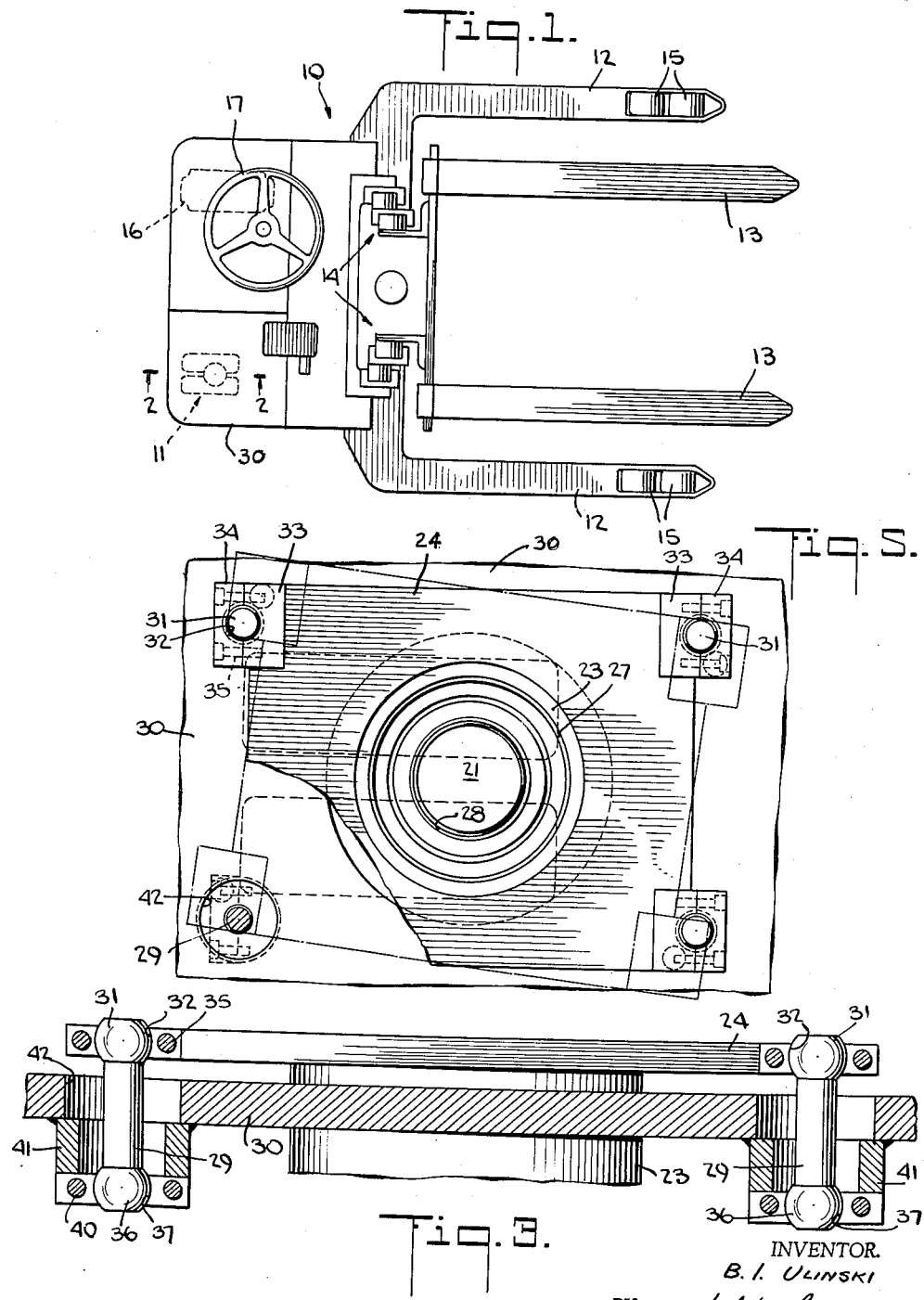
Jan. 1, 1963 — B. I. ULINSKI — 3,071,389
MOUNTING FOR CASTER WHEEL OF INDUSTRIAL TRUCK
Filed Jan. 11, 1962 — 2 Sheets-Sheet 1
INVENTOR.
B. I. ULINSKI
BY
ATTORNEY Jan. 1, 1963 B. I. ULINSKI 3,071,389
MOUNTING FOR CASTER WHEEL OF INDUSTRIAL TRUCK
Filed Jan. 11, 1962 2 Sheets-Sheet 2
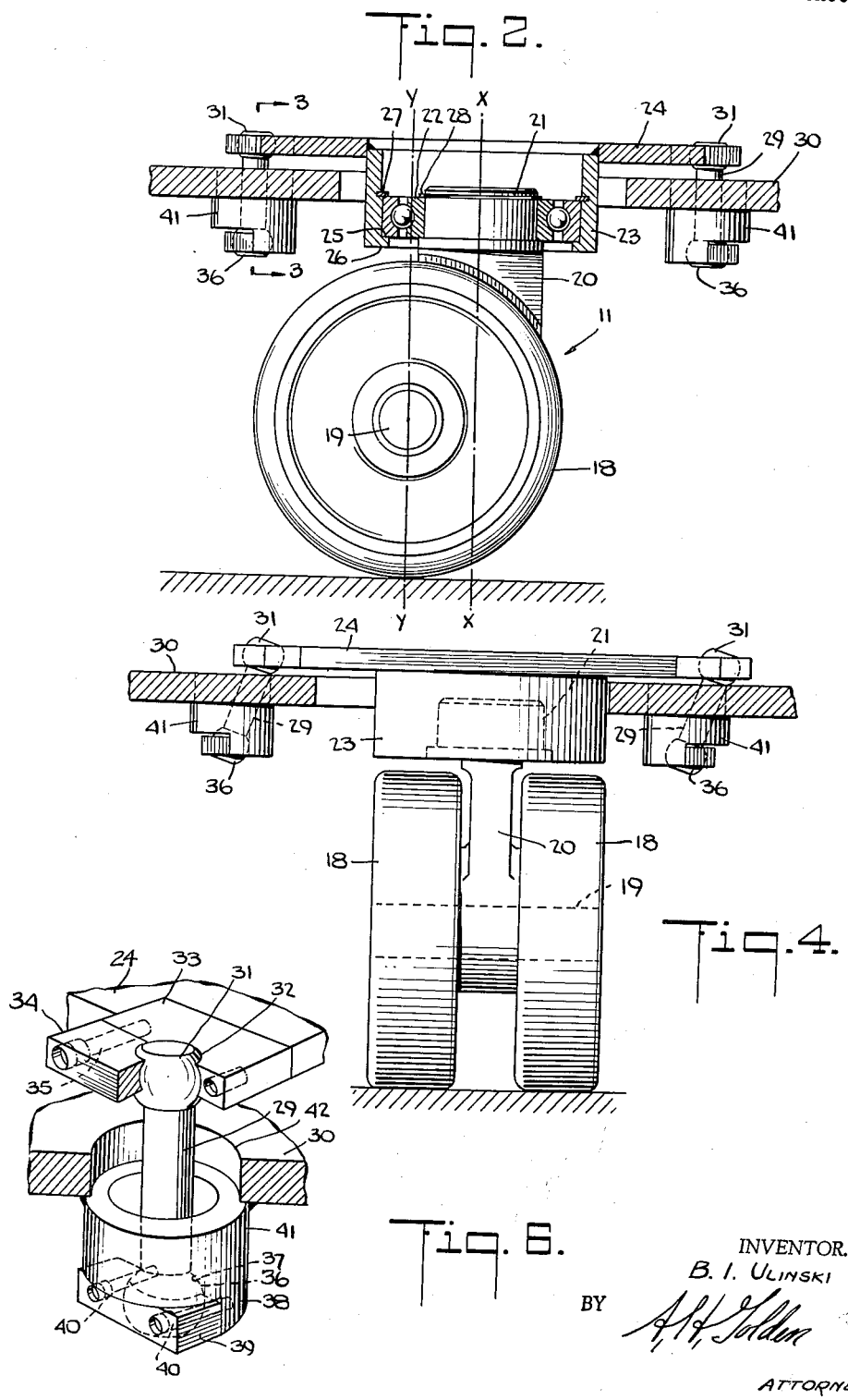
INVENTOR.
B. I. ULINSKI

3,071,389
MOUNTING FOR CASTER WHEEL OF
INDUSTRIAL TRUCK
Bronislaus I. Ulinski, Flossmoor, Ill., assignor to The
Yale and Towne Manufacturing Company, Stamford,
Conn., a corporation of Connecticut
Filed Jan. 11, 1962, Ser. No. 165,531
4 Claims. (Cl. 280—79.1)

This invention relates to an industrial truck, and more particularly to the mounting of a caster wheel unit on such a truck.

Industrial trucks frequently use one or more caster wheels as supporting wheels because caster wheels are self-steering and swing in the proper direction in accordance with changes in the direction of movement of the truck.

When the direction of movement of a truck incorporating a caster wheel is completely reversed, the caster wheel unit must swing 180° about its caster axis. If the caster axis of the caster wheel is fixed relatively to the truck frame so that it cannot shift laterally relatively to the frame, it is necessary either for the caster wheel to scrape relatively to the floor, in order to swing 180°, or for the truck frame to shift sidewise relatively to the floor with resulting scraping of non-castering wheels of the truck. In either event, wearing of the tires of the wheels, or in some instances, shearing of the tires from the wheels, results if this scraping or scuffing of the wheels on the floor is excessive.

In my coopending application, Serial No. 118,942, filed June 22, 1961, and entitled "Caster Wheel Mounting," I disclose an arrangement which permits lateral movement of the caster axis or pivot of the caster wheel in the transverse direction of the truck. I have found that this arrangement materially reduces scraping of the noncastering wheels or the caster wheel as the caster wheel swings 180° about its caster axis during reversal of the truck, and also reduces the forces tending to shear the tires from the wheel.

In accordance with this invention, I have now found that scraping of the caster or non-castering wheels can be further reduced and smoother steering of the truck obtained by providing for universal lateral movement of the caster axis or pivot relatively to the truck in all directions from a center position, rather than in just the transverse direction as provided by the ararngement disclosed in my earlier application.

In the preferred form of this invention, the truck fame is suspended from the caster wheel unit by links which are attached to the frame and caster wheel unit through universal means allowing universal pivotal movement of the links, and therefore, universal movement of the caster axis or pivot in all lateral directions from a center position. At the same same time, the weight of truck holds the caster axis or pivot yieldingly in a center position during normal forward and reverse operations.

The invention and its advantages having been broadly described, a more detailed description of one embodiment of the invention is given hereafter by reference to the accompanying drawings, wherein:

FIG. 1 is a top plan view of an industrial truck incorporating a caster wheel unit mounted in accordance with the invention;

FIG. 2 is a sectional view taken on the line 2—2 of FIG. 1;

FIG. 3 is a sectional view taken on the line 3—3 of FIG. 2;

FIG. 4 is a sectional view similar to that of FIG. 2, but showing the caster wheel turned 90°, and the caster axis of the caster wheel unit shifted relatively to the truck frame through pivotal movement of the supporting links;

FIG. 5 is a plan view showing in solid lines the centered position of the caster wheel unit, as illustrated in FIG. 2, and showing in broken lines the caster wheel unit in a shifted position;

FIG. 6 is a perspective view, partly in section, showing the mounting of the supporting links for universal pivotal movement.

Referring to the drawings, and in particular to FIG. 1, there is shown a truck 10 incorporating a caster unit 11 mounted on the truck in accordance with the invention.

The particular truck illustrated is of the general type disclosed in United States Patent No. 2,793,875 issued to George F. Quayle. While the invention is described hereinafter in conjunction with such a truck, it will be appreciated that this is for the purpose of illustration and that the caster unit of the invention may be used on various types of styles of industrial trucks. It is sufficient, therefore, to point out that the truck 10 is a lift truck of the straddle type having a pair of laterally spaced legs 12, and having lift forks 13 mounted on a mast structure 14 for vertical movement down between the legs 12 to engage or deposit a load on the floor.

The truck 10 is supported at its forward end by wheels 15 carried adjacent the outer ends of each leg 12 and is supported at the rear end by the caster unit 11 on one side and by a combined steering and traction wheel 16 on the other side. The steering and traction wheel 16 is driven by a suitable motor, not shown, and is steered by a steering wheel or handle 17.

As best shown in FIGS. 2 and 3, the particular caster unit 11 illustrated is of the dual wheel type incorporating two wheels 18 which are mounted for rotation on a common horizontal axle 19. The axle 19 is secured to or formed integrally with a central support member 20 which extends up between the wheels 18 and has a vertical shaft portion 21 which is welded or otherwise secured to the top of the supporting member 20. The shaft portion 21 extends through a bearing 22 carried by a cylindrical ring member 23. The ring member 23 in turn is welded or otherwise secured to a horizontal plate 24. The wheels 18 may, therefore, pivot or swivel relatively to the plate 24 about a vertical caster axis, identified as X—X in FIG. 2. The bearing 22 is held assembled in the ring member 23 between an annular shoulder 25 provided by an inturned flange 26 formed on the lower end of the ring 23, and a suitable split ring retainer 27. The shaft portion 21 of the axle support member 20 is secured against downward endwise movement out of the bearing 22 by means of a split ring retainer 28.

In accordance with the usual practice in caster wheel construction, the axle 19 about which the wheels 18 rotate is spaced or offset laterally from the caster X—X, as shown in FIG. 2 by the space between the axis X—X and a vertical axis Y—Y, which extends through the axle 19. It will be appreciated that if the direction of movement of the truck is completely reversed, the wheels 18 must swing or swivel 180° about the axis X—X. If the caster axis X—X is fixed against lateral shifting, it is necessary for the wheels 18 to either scrape relatively to the floor, in order for the wheels 18 to swing or swivel 180° about the axis X—X, or for the truck frame to shift laterally relatively to the floor with resulting scraping of the non-castering wheels, such as the wheels 15 and 16 of the truck.

In accordance with this invention, such scraping of the tires of either the caster wheels or the non-castering wheels is substantially eliminated and steering improved by mounting the caster axis or pivot of the caster wheels for universal lateral movement relatively to the truck frame in all directions from a center position. With this arrangement, the caster axis or pivot, rather than the truck frame or caster wheels, moves laterally relatively to the floor so that scraping of the caster wheels or non-castering wheels is substantially eliminated when the direction of movement of the truck is reversed, regardless of the particular direction in which the truck is initially moving.

In the form of the invention as illustrated in the drawings, this universal lateral movement of the caster X—X is provided by suspending the truck frame 30 from the plate 24 by four links 29 which are provided one at each of the four corners of the plate 24 and are pivotally secured at their upper and lower ends respectively to the plate 24 and the truck frame 30 through ball and socket type universal joints which allow universal lateral movement of the plate 24 and therefore, the caster axis X—X relatively to the truck frame 30. While four such links 29 are illustrated, it will be appreciated that three spaced links could be used.

As best shown in FIG. 6, the universal joint through which each link 29 is connected to the plate 24 includes a ball portion 31 which is secured to or formed integrally with the upper end of the link 29 and a socket 32 for receiving the ball portion 31 which is formed between a block 33 which is welded or rigidly secured to a corner of the plate 24 and a removable block 34 which is secured to the plate 33 through screws 35. The universal joint through which each link 29 is connected to the truck frame 30 includes a ball portion 36 which is secured to or formed integrally with the lower end of the link 29 and a socket 37 for receiving the ball portion 36 which is formed between a part 38 fixed to the frame 30 and a removable block 39, which is secured to the fixed part 38 by screw 40. Fixed part 38 is conveniently formed as an integral extension of a ring or sleeve member 41 by cutting away half of the lower end of the sleeve 41. The upper end of the sleeve 41 is welded to the lower surface of the frame 30 around an opening 42 through the frame 30, and the link 29 extends upwardly through the sleeve member 41 and through the opening 42.

By this arrangement, the plate 24, bearing 22 and shaft portion 21 may move bodily of the truck in all lateral directions, as shown in FIGS. 4 and 5, by swinging of the links 29 through their universal pivotal connections with the plate 24 and the truck frame 30. This permits universal movement of the caster axis X—X laterally relatively to the floor and truck frame as the caster wheels 18 swing about the caster axis X—X, thereby eliminating scraping of the caster wheels 18 or the non-castering wheels 15 and 16 on the floor, regardless of the direction in which the truck is moving at the time the motion is reversed. It will also be appreciated that when the forces shifting the caster axis X—X laterally of the truck are relieved, the weight of the truck frame will urge links 29 again to the vertical position, as shown in FIG. 2, so as to return the caster axis X—X to a centered position.

From the preceding description, it can be seen that there is provided a novel mounting for a caster unit of an industrial truck which will eliminate or materially reduce scraping of the caster or non-castering wheels of the truck when the direction of movement of the truck is reversed, regardless of the direction in which the truck is initially moving. While one form of the invention has been shown and described, it will be appreciated that this is for the purpose of illustration and that changes and modifications can be made therein without departing from the spirit and scope of the invention.

I now claim:

1. An industrial truck comprising a frame, wheels supporting said frame, at least one of said wheels being a caster wheel having a caster pivot about which the caster wheel may move as the direction of the truck is changed, pivotally mounted links suspending said frame from said caster pivot and connected to said frame and caster pivot through universal joints, whereby said caster pivot may move in all directions from a center position by pivoting of said links as the caster wheel swings about the caster pivot and the weight of the truck acting through said links serves to urge said caster pivot to said center position after a change in the direction of movement of the truck.

2. A truck as defined in claim 1 in which the universal joints are ball and socket type joints.

3. An industrial truck comprising a frame, wheels supporting said frame, at least one of said wheels being a caster wheel having a caster pivot about which the caster wheel may move as the direction of the truck is changed, means connected between said frame and said caster pivot for constantly urging said caster pivot to a center position while allowing bodily universal lateral movement of said caster pivot in all directions from a center position as the caster wheel swings about the caster pivot, whereby said caster pivot moves laterally of said frame during a change in the direction of movement of said truck and is returned to said center position after a change in direction of movement of the truck.

4. An industrial truck comprising a frame, wheels supporting said frame, at least one of said wheels being a caster wheel having a caster pivot about which the caster wheel may move as the direction of the truck is changed, means suspending said frame from said caster pivot for relative swinging movement, whereby said frame in effect hangs from said caster pivot and is supported thereby, said means suspending said frame from said caster pivot permitting bodily universal lateral movement of said caster pivot relatively to said frame in all directions from a center position as the caster wheel swings about the caster pivot and the weight of the truck acting through said suspending means constantly urges said caster pivot to said center position.

References Cited in the file of this patent

UNITED STATES PATENTS

| | | |
|---|---|---|
| 1,589,104 | Bull | June 15, 1926 |
| 2,753,946 | Quayle | July 10, 1956 |
| 2,793,875 | Quayle | May 28, 1957 |